(12) United States Patent
Basu et al.

(10) Patent No.: US 8,046,352 B2
(45) Date of Patent: Oct. 25, 2011

(54) EXPRESSION REPLACEMENT IN VIRTUAL COLUMNS

(75) Inventors: Subhransu Basu, Fremont, CA (US); Harmeek Singh Bedi, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 340 days.

(21) Appl. No.: 11/951,918

(22) Filed: Dec. 6, 2007

(65) Prior Publication Data

US 2009/0150366 A1 Jun. 11, 2009

(51) Int. Cl.
*G06F 17/30* (2006.01)
(52) U.S. Cl. ...................................................... 707/713
(58) Field of Classification Search ........................ 707/3
See application file for complete search history.

(56) References Cited

U.S. PATENT DOCUMENTS

| | | | |
|---|---|---|---|
| 5,761,653 A * | 6/1998 | Schiefer et al. .......................... | 1/1 |
| 5,822,142 A | 10/1998 | Hicken | |
| 5,899,986 A * | 5/1999 | Ziauddin ............................... | 1/1 |
| 5,960,428 A * | 9/1999 | Lindsay et al. ......................... | 1/1 |
| 5,995,957 A * | 11/1999 | Beavin et al. .......................... | 1/1 |
| 6,006,219 A * | 12/1999 | Rothschild ............................ | 1/1 |
| 6,029,163 A * | 2/2000 | Ziauddin ............................... | 1/1 |
| 6,112,199 A | 8/2000 | Nelson | |
| 6,477,523 B1 * | 11/2002 | Chiang ................................. | 1/1 |
| 6,524,664 B1 | 2/2003 | Hashimoto et al. | |
| 6,609,131 B1 | 8/2003 | Zait et al. | |
| 6,665,684 B2 | 12/2003 | Zait et al. | |
| 6,711,563 B1 | 3/2004 | Koskas | |
| 6,820,095 B1 | 11/2004 | Yeung et al. | |
| 6,830,785 B1 | 12/2004 | Hayakawa et al. | |
| 6,931,390 B1 | 8/2005 | Zait et al. | |
| 7,143,105 B2 | 11/2006 | Nakano et al. | |
| 7,158,994 B1 * | 1/2007 | Smith et al. ..................... | 707/717 |
| 7,158,996 B2 | 1/2007 | Croisettier et al. | |
| 7,171,408 B2 | 1/2007 | Zuzarte | |
| 7,458,066 B2 | 11/2008 | Rhine | |
| 7,693,812 B2 | 4/2010 | Lim et al. | |
| 7,836,098 B2 * | 11/2010 | Baby et al. ..................... | 707/102 |
| 2001/0016843 A1 * | 8/2001 | Olson et al. ........................ | 707/3 |
| 2002/0194157 A1 | 12/2002 | Zait et al. | |
| 2003/0084025 A1 * | 5/2003 | Zuzarte ............................. | 707/2 |
| 2003/0149702 A1 | 8/2003 | Saffer et al. | |
| 2006/0206507 A1 | 9/2006 | Dahbour | |
| 2007/0083483 A1 * | 4/2007 | Lawande .......................... | 707/1 |
| 2008/0172353 A1 * | 7/2008 | Lim et al. ......................... | 706/47 |
| 2008/0172360 A1 * | 7/2008 | Lim et al. .......................... | 707/3 |
| 2009/0019077 A1 * | 1/2009 | Baby et al. ..................... | 707/102 |

OTHER PUBLICATIONS

U.S. Appl. No. 11/951,933, filed Dec. 6, 2007, Restriction Requirement, Mailing Date Mar. 23, 2010. U.S. Appl. No. 11/951,890, filed Dec. 6, 2007, Restriction Requirement, Mailing Date Mar. 24, 2010.
U.S. Appl. No. 11/951,890, filed Dec. 6, 2007, Final Office Action, Mailing Date Dec. 23, 2010.
U.S. Appl. No. 11/951,933, filed Dec. 6, 2007, Final Office Action, Mailing Date Dec. 23, 2010.
Ian Smith, "Guide to Using SQL: Computed and Automatic Columns", Oracle Rdb Journal—Automatic Columns, Sep. 2008 (originally May 2002), http://www.oracle.com/technetwork/database/rdb/automatic-columns-132042.pdf, 9 pages.

* cited by examiner

*Primary Examiner* — Sheree Brown
(74) *Attorney, Agent, or Firm* — Hickman Palermo Truong & Becker LLP

(57) ABSTRACT

Techniques are described herein for replacing a part of an expression in a query to a database with a virtual column. A virtual column is defined by the database to contain results of a defining expression. A part of an expression in a query is replaced with a virtual column whose defining expression is equal to the part of the expression in the query. The part of an expression in a query can be the entire expression. When an expression in a query can be replaced with more than one replacement expression involving virtual columns, the replacement expression with the least cost of query processing is selected.

16 Claims, 2 Drawing Sheets

| C1 | C2 | C3 |
|---|---|---|
| 1 | 10 | 11 |
| 2 | 20 | 22 |
| 3 | 30 | 33 |
| 4 | 40 | 44 |
| 5 | 50 | 55 | t1 / 100

EXPRESSION REPLACEMENT IN VIRTUAL COLUMNS

RELATED APPLICATIONS

The present application is related to U.S. patent application Ser. No. 11/951,890, titled Virtual Columns, filed by Subhransu Basu and Harmeek Singh Bedi on Dec. 6, 2007 and U.S. patent application Ser. No. 11/951,933, titled Partitioning in Virtual Columns, filed by Subhransu Basu, Harmeek Singh Bedi, and Ananth Raghavan on Dec. 6, 2007, the entire contents of which are incorporated herein by reference.

FIELD OF THE INVENTION

The present invention relates to database systems, and in particular, to techniques for representing and manipulating expressions in database systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
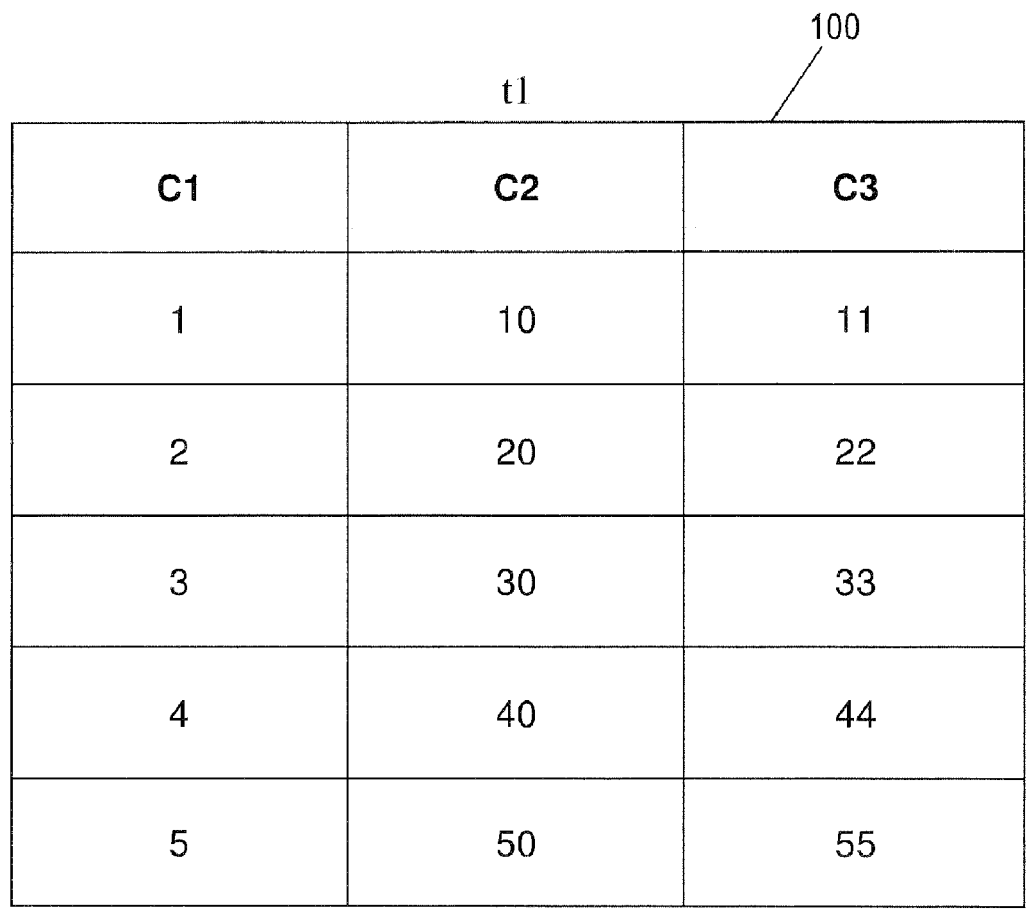
FIG. 1 illustrates an example of a table containing two columns and a virtual column.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Introduction

In a database management system (DBMS), data is stored in one or more data containers, each container contains records, and the data within each record is organized into one or more fields. In relational DBMSs, the data containers are referred to as tables, the records are referred to as rows, and the fields are referred to as columns.

In a relational DBMS, many operations can be performed on columns in tables. For example, statistics can be gathered on columns. Columns can also be indexed. Furthermore, constraints can be defined on columns in different tables for the purpose of maintaining referential integrity between the tables. Columns are also utilized in performing join predicate push-down operations. Finally, tables can be partitioned on columns, enabling optimizations such as partition-pruning and partition-wise joins.

Data in columns is stored as part of a table in databases, consuming permanent storage resources. To circumvent the need to store some data, a user may choose to compute the data only when it is needed for an operation and discard the data once the operation has completed. This computation of data may be specified within an expression in a query language like SQL. Expressions provide a way to compute data on demand without the need for permanent storage.

Virtual Columns

An Example

According to one technique, virtual columns may be defined within a DBMS to facilitate the processing and manipulation of computed data. A virtual column is a derived, or computed, column, which may or may not be materialized on a disk. In other words, unlike a regular column, which is stored on a disk as part of a table, a virtual column may be stored for only a short period of time in temporary storage such as volatile memory, and may be discarded at the end of an operation. The values contained in a virtual column are derived by computation of an expression or function and are computed on demand. Virtual columns can be used in queries just like any other regular table columns, providing a simple, elegant, and consistent mechanism for accessing expressions in a SQL statement.

A virtual column is illustrated with the following DDL statement.

create table t1 (c1 number, c2 number, c3 as (c1+c2))

When a DBMS receives and processes this statement, it defines and creates a table t1, where columns c1 and c2 contain values of the number data type. Table t1 also includes a virtual column c3. When a DBMS creates a virtual column, such as c3, in response to receiving a DDL statement such as the one above, the DBMS generates metadata defining the virtual column as containing the results of an expression. A defined virtual column need not contain any physical data. Rather, a virtual column logically contains data values which are based on the results of an expression.

Virtual column c3 is derived from the expression "c1+c2", where c1 and c2 are regular columns in table t1. The values in a virtual column conform to the data types in the underlying expression that describes the virtual column. In this case, because c1 and c2 contain values of the number data type, c3 also necessarily contains values of the number data type. Table 100 in FIG. 1 illustrates an example illustrating a table t1 with example values in regular columns c1 and c2 and corresponding computed values in virtual column c3. Table 100 contains five rows. In the first row, for example, column c1 contains the value 1 and column c2 contains the value 10. Therefore, virtual column c3, which contains values that are sums of values in columns c1 and c2, contains the value 11 in the first row. Although virtual column c3 is shown as being in table t1, this is only for the purpose of illustration. Virtual column c3 need not be stored on disk as part of table t1 like regular columns c1 and c2, and often will not be in order to conserve storage resources. When a query statement such as "select c3 of t1" is processed by a DBMS, the values of c3 may be computed dynamically based on values stored in regular columns c1 and c2 at the time of the computation.

Once a virtual column is defined, it may be referenced in SQL queries like a regular column. For example, the following SQL statement uses the virtual column c3 in a select statement.

select * from t1 where c3>30

The above statement selects all rows from the table t1 which contain a value greater than 30 in the c3 column. Again, the values in c3 are not stored on disk, but are computed on demand by a DBMS. Therefore, when a DBMS executes the above statement, the sums of the values in regular columns c1 and c2 are calculated and compared to the value 30 in determining which rows in t1 fulfill the query request.

For simplicity, in the examples in this disclosure, virtual column c3 is described by the expression c1+c2. Significantly, a virtual column may also be derived from SQL functions and user-defined functions in addition to expressions.

Replacing Expressions with Virtual Columns

Once defined, virtual columns may be utilized in the same fashion as regular columns, even though virtual columns are not necessarily materialized on disk. For example, in a DBMS, indexes can be created on virtual columns and column statistics can be gathered on virtual columns. Furthermore, a DBMS may enforce referential integrity between two database tables using virtual columns as primary keys. Virtual columns can also be considered by a query optimizer for join predicate push-downs like regular columns. Finally, a DBMS can partition a table using a virtual column as a partitioning key. Once partitioned, techniques such as partition pruning and partition-wise joins can then be employed on the partitioned tables.

Query statements processed by DBMSs, however, often do not expressly reference virtual columns. For example, pre-existing query programs may have been written before a DBMS supported virtual columns. Although query processing time for these programs would be significantly reduced if the programs are rewritten to take advantage of virtual columns, rewriting the programs incurs a high cost of human labor that often outweighs the advantage of increased query processing efficiency. Therefore, according to one technique, expressions in a query statement which are equivalent to defined virtual columns are automatically replaced with the equivalent virtual columns, allowing column-based optimizations for processing queries to be executed on the query statement without query rewrites by a human user. In one example, users of a particular database have written query programs without using virtual columns. The database administrator notices that many query statements in these query programs contain the expression c1+c2 for a particular table, where c1 and c2 are regular columns of the particular table. Using DDL statements, the database administrator creates a virtual column c3 in the particular table and defines it as c1+c2, but does not alter any of the query programs. In one embodiment, when the query programs are executed, the expression c1+c2 is automatically replaced with virtual column c3. Once this replacement occurs, column functions such as statistics and join predicate push-downs can be performed by the DBMS on virtual column c3, thereby increasing the efficiency of the query execution.

According to one technique, the determination of equivalence is based on the logical equivalence between an expression in a query and an expression defining a virtual column. For example, if c1 and c2 are regular columns of the data type number, and if virtual column c3 is defined as c1+c2, then both the expression c1+c2 and the expression c2+c1 are replaced with virtual column c3. In determining the logical equivalence of a first expression and a second expression, the associative, commutative, and distributive properties of the terms in the expression are taken into account. For example, if c1+c2 are of a data type where c1+c2 is not equal to c2+c1, then the expression c2+c1 will not be replaced with virtual column c3.

Partial Expression Replacement

According to one technique, an expression may be partially replaced with a virtual column. For example, the query statement select * from t1 where c1+c2+c4>30 may be replaced by the query statement select * from t1 where c3+c4>30, if c3 is a virtual column defined to be c1+c2.

Collisions in Expression Replacement

In some cases, an expression may be replaced by one of several candidate replacement expressions. In one example, a query statement includes the expression c1+c2+c4, where c1, c2, and c4 are all regular columns in the table t1. Two virtual columns, c3 and c5, have also been defined for table t1 where c3 is c1+c2 and c5 is c2+c4. In this example, the expression c1+c2+c4 can thus be replaced with either the expression c3+c4 or the expression c1+c5. According to one technique, when a base expression can be replaced by more than one replacement expression, the replacement expression with the least cost is selected. Cost analysis can be based on a variety of factors, such as the existence of indexes and materialized views for virtual columns. For example, if an index exists for c5 but not c3, then the expression c1+c5 is less costly than the expression c3+c4 because values for c5 need not be computed.

Hardware Overview

Figure 2:
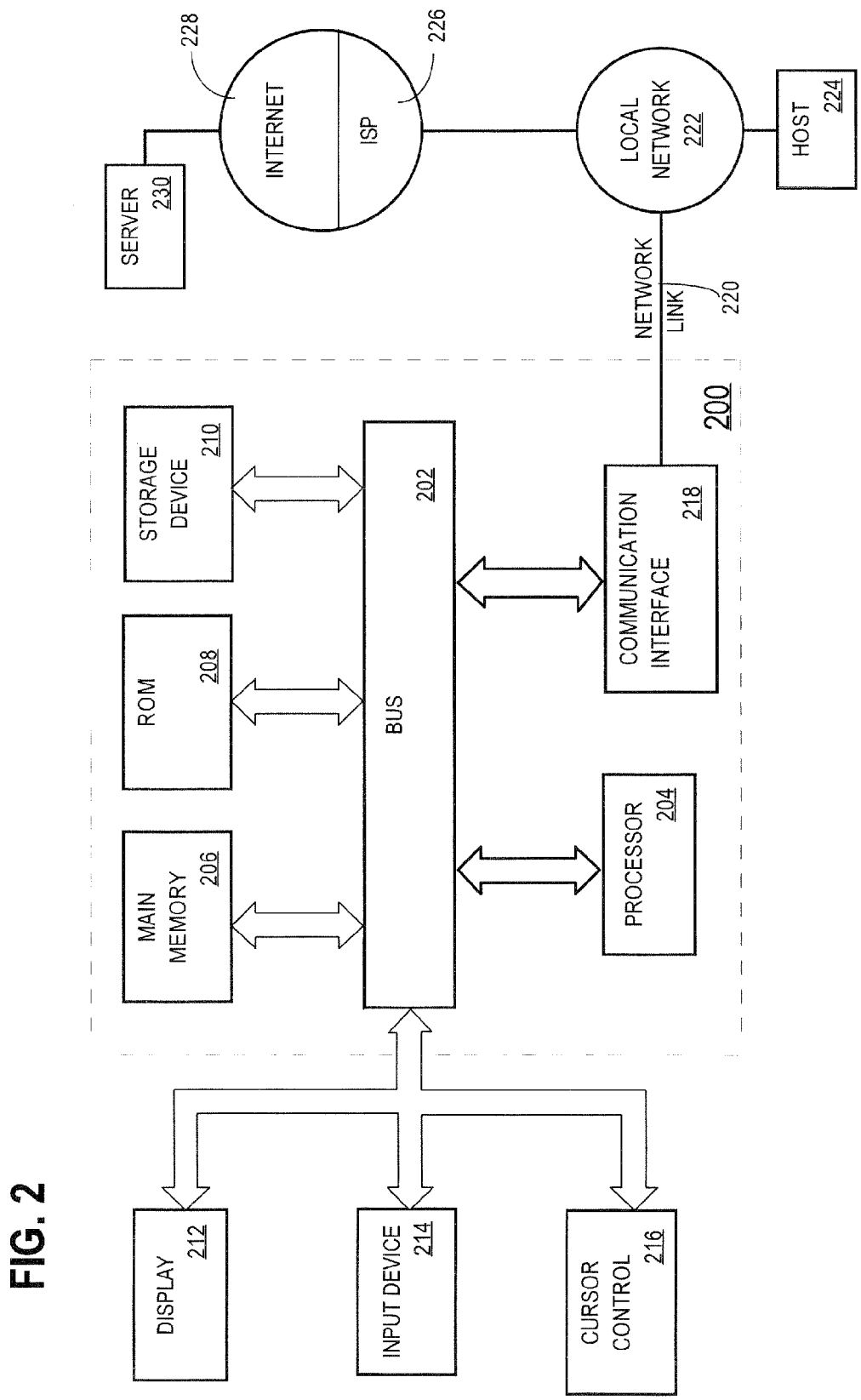
FIG. 2 is a diagram of a computer system that may be used in an implementation of an embodiment of the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for use in evaluating queries, the method comprising:
    receiving a query that includes an expression;
    determining whether a part of the expression in the query is equivalent to a defining expression for a virtual column of a table;
    wherein database metadata defines said virtual column as a column of the table that contains, for each row in said table, a data value computed from the defining expression;
    wherein said database metadata includes a name for said virtual column that is used in queries to reference said virtual column;
    in response to determining that the part of the expression is equivalent to the defining expression for the virtual column, rewriting the query to generate a rewritten query, wherein the step of rewriting the query comprises replacing, in the query, the part of the expression with the virtual column; and
    processing the rewritten query;
    wherein the method is performed by one or more computing devices.

2. The computer-implemented method of claim 1,
    wherein the step of determining whether the part of the expression in the query is equivalent to a defining expression for a virtual column comprises:
        determining whether the part of the expression in the query is logically equivalent to the defining expression for the virtual column.

3. The computer-implemented method of claim 2,
    wherein determining whether the part of the expression in the query is logically equivalent to the defining expression for the virtual column is based at least in part on associative, commutative, and distributive properties of the part of the expression and the defining expression for the virtual column.

4. The computer-implemented method of claim 1, wherein the part of the expression includes an entirety of the expression.

5. A computer-implemented method for use in evaluating queries, the method comprising:
receiving a query that includes an expression;
determining whether a first part of the expression in the query is equivalent to a first defining expression for a first virtual column of a first table,
wherein database metadata defines the first virtual column as
a column of said first table that contains, for each row in said first table, a data value computed from the first defining expression;
wherein said database metadata includes a name for said first virtual column that is used in queries to reference said first virtual column;
determining whether a second part of the expression in the query is equivalent to a second defining expression for a second virtual column of a second table,
wherein database metadata defines the second virtual column as a column of said second table that contains, for each row in said second table, a data value computed from the second defining expression;
wherein said database metadata includes a name for said second virtual column that is used in queries to reference said second virtual column;
in response to determining that the first part of the expression is equivalent to the first defining expression for the first virtual column and that the second part of the expression is equivalent to the second defining expression for the second virtual column, performing the steps of:
rewriting the query to generate a rewritten query, wherein the step of rewriting the query comprises:
selecting either the first virtual column or the second virtual column;
in response to selecting the first virtual column, replacing, in the query, the first part of the expression with the first virtual column;
in response to selecting the second virtual column, replacing, in the query, the second part of the expression with the second virtual column;
processing the rewritten query;
wherein the method is performed by one or more computing devices.

6. The computer-implemented method of claim 5, wherein the step of selecting either the first virtual column or the second virtual column comprises:
determining a first cost for processing a first rewritten query, wherein the first rewritten query is based on the query and is generated by replacing, in the query, the first part of the expression with the first virtual column;
determining a second cost for processing a second rewritten query, wherein the second rewritten query is based on the query and is generated by replacing, in the query, the second part of the expression with the second virtual column;
determining whether the first cost is higher than the second cost;
in response to determining that the first cost is higher than the second cost, selecting the second virtual column;
determining whether the second cost is higher than the first cost;
in response to determining that the second cost is higher than the first cost, selecting the first virtual column.

7. The computer-implemented method of claim 6, wherein:
the step of determining a first cost for processing a first rewritten query includes determining whether an index exists for the first virtual column; and
the step of determining a second cost for processing a second rewritten query includes determining whether an index exists for the second virtual column.

8. The computer-implemented method of claim 6, wherein:
the step of determining a first cost for processing a first rewritten query includes determining whether a materialized view exists for the first virtual column; and
the step of determining a second cost for processing a second rewritten query includes determining whether a materialized view exists for the second virtual column.

9. A non-transitory computer-readable storage medium storing instructions for evaluating queries, the instructions including instructions which, when executed by one or more processors, cause the one or more processors to perform the steps of:
receiving a query that includes an expression;
determining whether a part of the expression in the query is equivalent to a defining expression for a virtual column of a table;
wherein database metadata defines said virtual column as a column of the table that contains, for each row in said table, a data value computed from the defining expression;
wherein said database metadata includes a name for said virtual column that can be is used in queries to reference said virtual column;
in response to determining that the part of the expression is equivalent to the defining expression for the virtual column, rewriting the query to generate a rewritten query, wherein the step of rewriting the query comprises replacing, in the query, the part of the expression with the virtual column; and
processing the rewritten query.

10. The non-transitory computer-readable storage medium of claim 9,
wherein the step of determining whether the part of the expression in the query is equivalent to a defining expression for a virtual column comprises:
determining whether the part of the expression in the query is logically equivalent to the defining expression for the virtual column.

11. The non-transitory computer-readable storage medium of claim 10,
wherein determining whether the part of the expression in the query is logically equivalent to the defining expression for the virtual column is based at least in part on associative, commutative, and distributive properties of the part of the expression and the defining expression for the virtual column.

12. The non-transitory computer-readable storage medium of claim 9, wherein the part of the expression includes an entirety of the expression.

13. A non-transitory computer-readable storage medium storing instructions for evaluating queries, the instructions including instructions which, when executed by one or more processors, cause the one or more processors to perform the steps of:
receiving a query that includes an expression;
determining whether a first part of the expression in the query is equivalent to a first defining expression for a first virtual column of a first table, wherein database metadata defines the first virtual column as
a column of said first table that contains, for each row in said first table, a data value computed from the first defining expression;
wherein said database metadata includes a name for said first virtual column that is used in queries to reference said first virtual column;
determining whether a second part of the expression in the query is equivalent to a second defining expression for a second virtual column of a second table, wherein database metadata defines the second virtual column as a column of said second table that contains, for each row in said second table, a data value computed from the second defining expression;
wherein said database metadata includes a name for said second virtual column that is used in queries to reference said second virtual column;
in response to determining that the first part of the expression is equivalent to the first defining expression for the first virtual column and that the second part of the expression is equivalent to the second defining expression for the second virtual column, performing the steps of:
rewriting the query to generate a rewritten query, wherein the step of rewriting the query comprises:
selecting either the first virtual column or the second virtual column;
in response to selecting the first virtual column, replacing, in the query, the first part of the expression with the first virtual column;
in response to selecting the second virtual column, replacing, in the query, the second part of the expression with the second virtual column;
processing the rewritten query.

14. The non-transitory computer-readable storage medium of claim 13, wherein the step of selecting either the first virtual column or the second virtual column comprises:
determining a first cost for processing a first rewritten query, wherein the first rewritten query is based on the query and is generated by replacing, in the query, the first part of the expression with the first virtual column;
determining a second cost for processing a second rewritten query, wherein the second rewritten query is based on the query and is generated by replacing, in the query, the second part of the expression with the second virtual column;
determining whether the first cost is higher than the second cost;
in response to determining that the first cost is higher than the second cost, selecting the second virtual column;
determining whether the second cost is higher than the first cost;
in response to determining that the second cost is higher than the first cost, selecting the first virtual column.

15. The non-transitory computer-readable storage medium of claim 14, wherein:
the step of determining a first cost for processing a first rewritten query includes determining whether an index exists for the first virtual column; and
the step of determining a second cost for processing a second rewritten query includes determining whether an index exists for the second virtual column.

16. The non-transitory computer-readable storage medium of claim 14, wherein:
the step of determining a first cost for processing a first rewritten query includes determining whether a materialized view exists for the first virtual column; and
the step of determining a second cost for processing a second rewritten query includes determining whether a materialized view exists for the second virtual column.

* * * * *

UNITED STATES PATENT AND TRADEMARK OFFICE
CERTIFICATE OF CORRECTION

| | | |
|---|---|---|
| PATENT NO. | : 8,046,352 B2 | |
| APPLICATION NO. | : 11/951918 | |
| DATED | : October 25, 2011 | |
| INVENTOR(S) | : Basu et al. | |

It is certified that error appears in the above-identified patent and that said Letters Patent is hereby corrected as shown below:

In column 8, line 31, in Claim 9, after "that" delete "can be".

Signed and Sealed this
Seventh Day of February, 2012

David J. Kappos
*Director of the United States Patent and Trademark Office*